(12) United States Patent
Haftek

(10) Patent No.: US 6,826,011 B1
(45) Date of Patent: Nov. 30, 2004

(54) WRITER DESIGN ELIMINATING TRANSITION CURVATURE FOR VERY NARROW WRITER WIDTHS

(75) Inventor: Elzbieta Janina Haftek, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/442,671

(22) Filed: Nov. 18, 1999

Related U.S. Application Data

(60) Provisional application No. 60/109,107, filed on Nov. 18, 1998.

(51) Int. Cl.[7] ............................................. G11B 5/23
(52) U.S. Cl. ..................................................... 360/119
(58) Field of Search ................................ 360/119, 120, 360/121, 122, 125, 126

(56) References Cited

U.S. PATENT DOCUMENTS

| | | | |
|---|---|---|---|
| 4,219,855 A | | 8/1980 | Jones, Jr. |
| 5,141,623 A | | 8/1992 | Cohen et al. |
| 5,315,469 A | * | 5/1994 | McNeil ...................... 360/119 |
| 5,483,403 A | * | 1/1996 | Voegeli ...................... 360/321 |
| 5,546,254 A | | 8/1996 | Gill ............................. 360/319 |
| 5,606,478 A | * | 2/1997 | Chen et al. .................. 360/126 |
| 5,671,105 A | | 9/1997 | Sugawara et al. ........... 360/126 |
| 5,673,163 A | | 9/1997 | Cohen ......................... 360/321 |
| 5,696,656 A | | 12/1997 | Gill et al. .................... 360/327.31 |
| 5,734,533 A | * | 3/1998 | Nepela ........................ 360/119 |
| 6,072,670 A | * | 6/2000 | Furuichi et al. ............. 360/126 |
| 6,163,436 A | * | 12/2000 | Sasaki et al. ................ 360/123 |
| 6,169,642 B1 | * | 1/2001 | Mino et al. .................. 360/126 |

OTHER PUBLICATIONS

Pohm et al., "Magnetization in Minimum Geometry M–R Heads With Multilayer Films", *IEEE Transactions on Magnetics*, vol. MAG–20, No. 5, pp. 863–865 (Sep. 1984).

Bertram, H., editor, *Therory of magnetic recording*, pp. 133, 213 by Cambridge University Press (1994).

Su, J. et al., "Track Edge Phenomena in Thin Film Longitudinal Media", *IEEE Transactions on Magnetics*, vol. 25, No. 5, pp. 3384–3386 (Sep. 1989).

Wang, P. et al., "Thin Film Head with Staggered Pole Tips", *IEEE Transactions on Magnetics*, vol. 27, No. 6, pp. 4710–4712 (Nov. 1991).

* cited by examiner

*Primary Examiner*—Carl Whitehead, Jr.
*Assistant Examiner*—Jennifer M Dolan
(74) *Attorney, Agent, or Firm*—Merchant & Gould P.C.

(57) ABSTRACT

A magnetic transducer having a top pole and a bottom pole where the top pole is separated from the bottom pole by a gap layer. The top pole has a lower portion that faces the bottom pole. A middle section of the lower portion is separated from the bottom pole by a first distance and end sections of the lower portion are separated from the bottom pole by a second distance not equal to the first distance. The second distance is greater than 25% of the first distance.

21 Claims, 10 Drawing Sheets

US 6,826,011 B1

WRITER DESIGN ELIMINATING TRANSITION CURVATURE FOR VERY NARROW WRITER WIDTHS

This application claims the benefit of provisional application Ser. No. 60/109,107 filed Nov. 18, 1998.

FIELD OF THE INVENTION

The present invention is directed to magnetic thin film head (TFH) devices for recording magnetic transitions on a moving magnetic medium and, more particularly, to a magnetic head that reduces transition curvature for very narrow writer widths.

BACKGROUND OF THE INVENTION

In the operation of a typical inductive TFH device, a moving magnetic storage medium is placed near the exposed pole-tips of the TFH device. TFH is composed of the magnetic poles and coils wrapping around the poles. During a write operation, a current flowing through the coils induces magnetic flux in the magnetic poles and generates the magnetic field across the gap between pole tips, so called writer gap. This field extends (i.e. is fringing) into the nearby moving storage medium, inducing or writing a magnetic domain in the medium. The part of fringe field extending not through the writer gap but from the side of the top pole to the bottom pole can erase edges of the neighboring written tracks and therefore negatively affect the quality of written tracks. Alternating current causes writing magnetic domains of alternating polarity in the storage medium.

With ever increasing area densities there is a need for a head producing a very narrow track width and a very small bit cells down the track direction. The top pole width defines the width of the track and the writer gap length determines the bit cell length. As tracks get narrower, a curved part of the written track becomes a larger portion of the written track and is determined largely by the shape of the pole tip, magnetic properties of the material used at the writer gap length and write current. A fringe field extends into the nearby moving magnetic storage medium, inducing (or writing) a magnetic domain (in the medium) in the same direction. Impressing current pulses of alternative polarity across the coil causes the writing of magnetic domains of alternating polarity in the storage medium.

Prior-art magnetic recording inductive TFH devices include top and bottom magnetic core pole layers, usually of the alloy Ni—Fe (permalloy), connected through a via in the back-portion area, and separated by a thin gap layer between the pole-tips in the front of the device. The bottom pole-tip is usually designed to be wider than the top pole-tip in order to prevent "wraparound" due to misregistration or misalignent, as taught by R. E. Jones in U.S. Pat. No. 4,219,855. Alternatively, one or both pole-tips are trimmed by ion-milling or by reactive ion etching (RIE) to ensure similar width and proper alignment. Such a technique is disclosed, for example, by Cohen et al. in U.S. Pat. No. 5,141,623. As the track width decreases in order to increase the recording density, the write head pole-tips must be very narrow. P. K. Wang et al. describe elaborate schemes to obtain pole-tips for writing very narrow track width, in IEEE Transactions on Magnetics, Vol. 27, No. 6, p. 4710–4712. November 1991.

One of the problems associated with the prior-art pole-tip designs is that during write operations, substantial noise is introduced along the track-edges (on the magnetic storage medium), which adds to the noise generated by the medium during read operations. During the write operations, significant portions of the intense magnetic flux lines, emanating from the corners and side-edges of the pole-tips, deviate from a direction parallel to the track's length. The non-parallel magnetic field magnetizes the medium in the wrong directions, giving rise to noise along the track-edges. This noise is usually characterized as "track-edge fringing noise" and is a major obstacle to increasing the track density. According to a paper by J. L. Su and K. Ju in IEEE Transactions on Magnetics, Vol. 25, No. 5, pp. 3384–3386, September 1989, the track-edge noise in this particular case extends about 2.5 $\mu$m on each side of the written track. The high track-edge noise and wide writer width produced by the conventional design, limits its usefulness to relatively low track densities. As track density increases, the track width decreases, but the percentage of the curved transition relative to the track width increases.

U.S. Pat. No. 5,673,163 (Cohen) discloses a pinched-gap magnetic recording thin film head where substantial contact is established between the bottom pole-tip 14 and top pole-tip 18 thereby pinching or confining a gap segment 16. In a preferred embodiment the bottom pole-tip 14 and top pole-tip 18 are in actual physical contact. In other embodiments a small gap may separate the bottom and top pole-tips. The small gap or separation should be small enough to prevent the magnetic flux lines from emanating significantly from the pole-tips in those regions. The separation of the pole-tips in those regions should not exceed about 25% of G, the vertical distance between pole-tips in the gap area. Preferably, the separation should not exceed 5% of G.

SUMMARY OF THE INVENTION

According to a first aspect of the invention, there is provided a magnetic transducer device having a bottom magnetic pole, a nonmagnetic gap layer deposited on the bottom pole and a top pole deposited on the gap layer. The top magnetic pole has an upper portion and a lower portion. The lower portion faces a surface of the bottom pole and has a middle section that is separated from the bottom pole by the gap layer by a first distance. The lower portion has end portions located at each end of the middle portion that are separated from the bottom pole by the gap layer by a second distance where the second distance is greater than 25% of the first distance.

According to another aspect of the invention, the second distance ranges from about greater than 25% to about 60% of the first distance.

According to still another aspect of the invention, the device has a width measured between a left and a right side of the top pole ranging from about 0.3 microns to about 1.5 microns.

DETAILED DESCRIPTION OF THE PRESENTLY PREFERRED EMBODIMENTS

Figure 1:
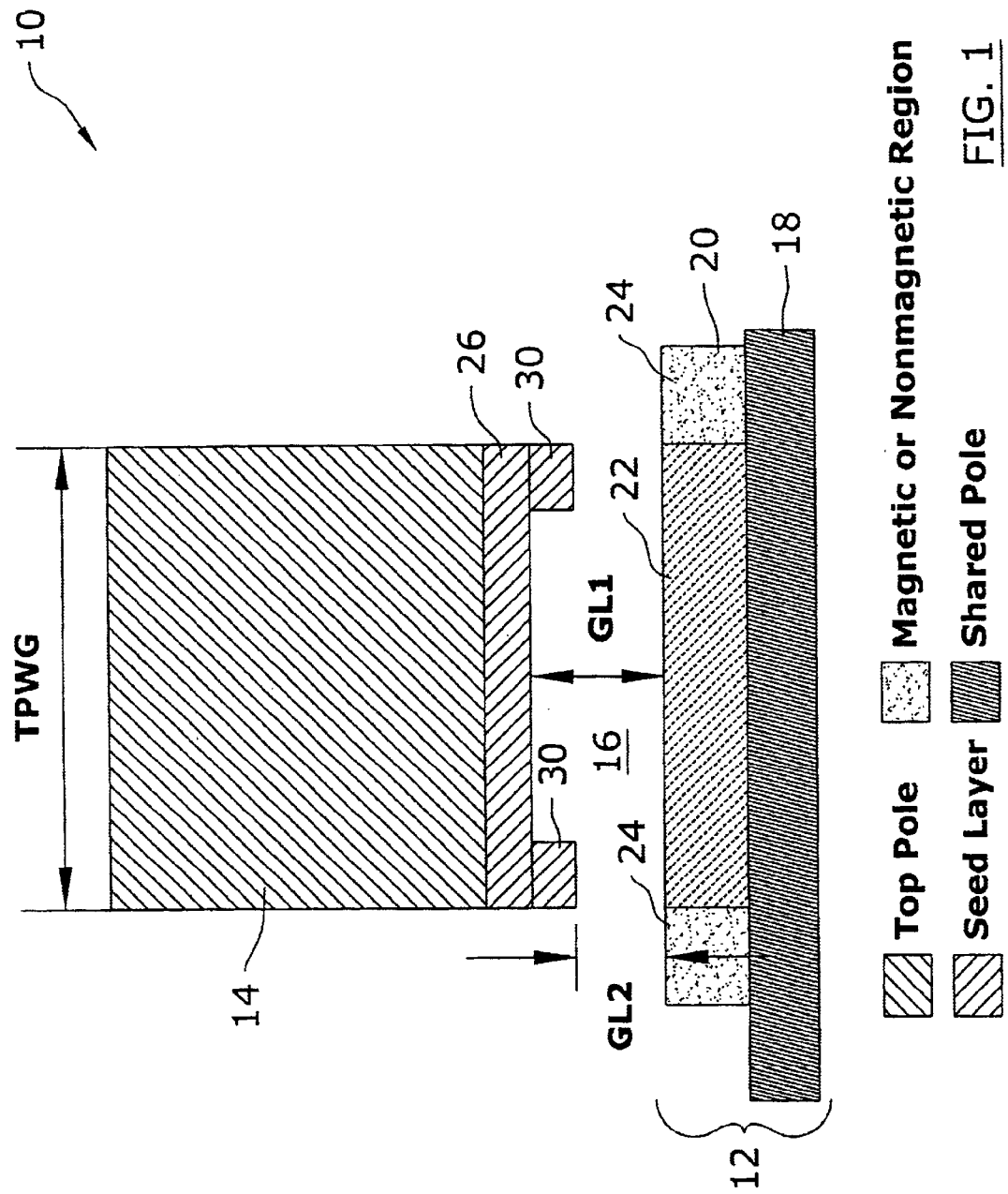
FIG. 1 shows an air-bearing surface (ABS) view of a magnetic thin film head according to a preferred embodiment of the present invention.

FIG. 1 shows an air-bearing surface (ABS) view of a magnetic thin film head 10 for recording transitions on a moving magnetic medium (not shown) according to a preferred embodiment of the present invention. The head 10 includes a bottom pole 12, a top pole 14 and a gap 16. In a preferred embodiment the bottom pole 12 consists of layer 18 and a top layer 20 called a mesa. A non-magnetic regions 24 abuts each end of the magnetic region 22. The magnetic region 22 preferably has a width substantially equal to the width of the layer 26 or top pole 14. The top pole 14 preferably has a seed layer 26 on its end that faces the bottom pole 12. The seed layer 26 is shaped so that a gap GL1 exists between the top pole 14 and bottom pole 12. In addition, a smaller gap GL2 exists at each end portion 30 of the top pole 14. In a preferred embodiment, GL2 ranges from about 25% to about 60% of GL1. More preferably GL2 is about 60% of GL1. Preferably $GL_2/GL_1 < 1.0$.

In the preferred embodiment shown in FIG. 1, the end portions of the top pole 14 are rectangular in shape. The fabrication of a head according to the present invention will be described in greater detail hereinafter. The gap 16 is preferably filled by a nonmagnetic material such as silicon oxide, silicon nitride, nickel palladium, $Al_2O_3$, $T_1$, titanium.

The head shown in FIG. 1 has a width TPWG that can range from about 0.3 microns to about 1.5 microns. In a preferred embodiment TPWG is about 0.5 microns. The gap length GL1 is about one-third of TPWG. Thus, GL1 can range from about 0.1 microns to about 0.3 microns and in a preferred embodiment is about 0.15 microns.

The top pole 14 is preferably made of magnetic material preferably Fe based alloys like NiFeCo, NiFe, FeTaN, FeAlN or any other iron nitrate with Hf or Zr additives. The seed layer 26 can be formed of the materials like those used in the top pole by sputtering, or electroplating. The shared pole of the bottom pole 12 is preferably made of Fe based alloy. The magnetic material 22 deposited on the shared pole is preferably formed of high moment Fe-based alloy. The nonmagnetic regions 24 are preferably formed of alumina, $SiO_2$, SiN, Ti. Alternatively, the magnetic and nonmagnetic regions 22, 24 can be eliminated so that the bottom pole 12 is flat and does not have mesa.

Figure 2:
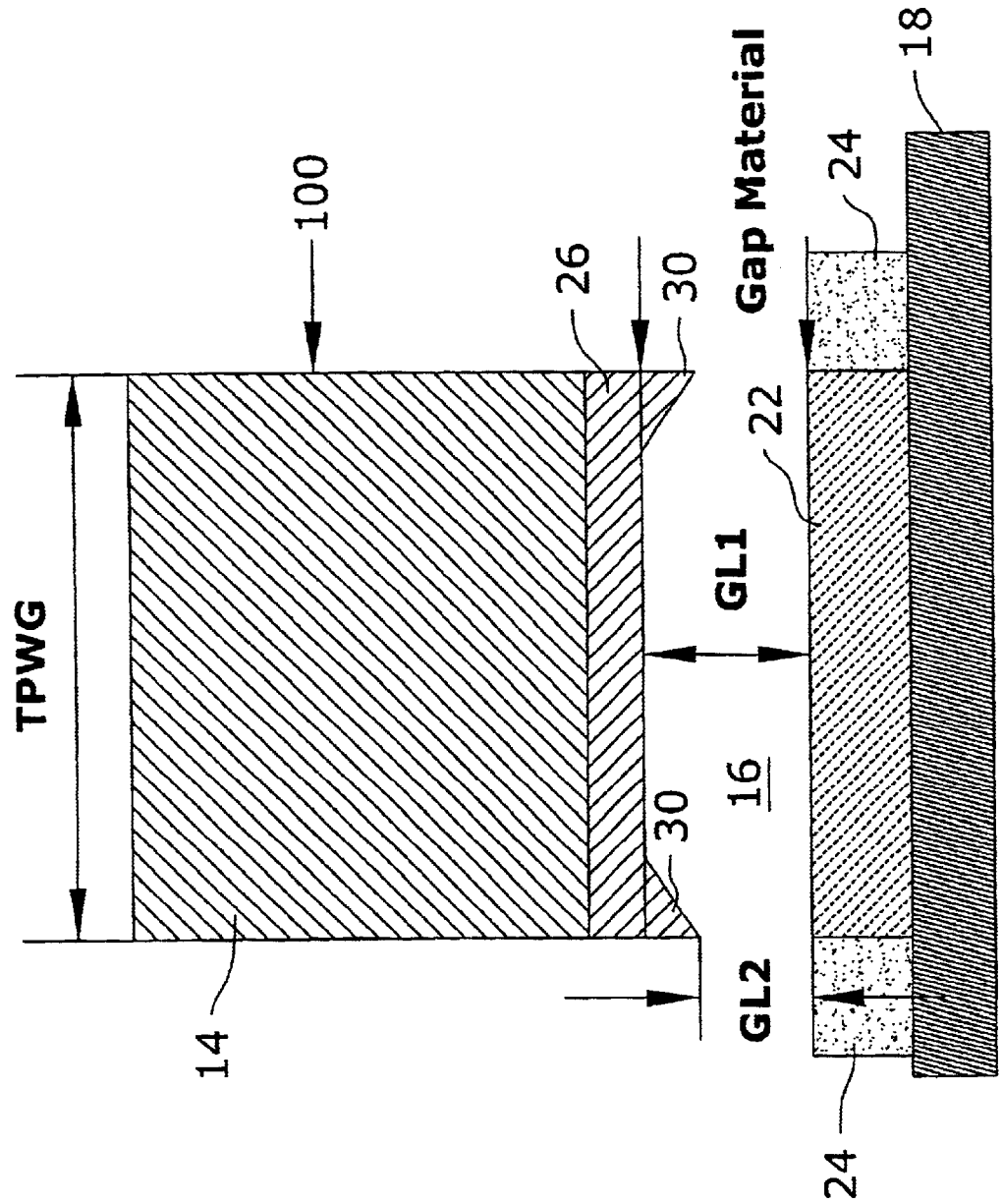
FIG. 2 shows an ABS view of a head according to a second preferred embodiment of the present invention.

FIG. 2 shows an ABS view of a head 100 according to a second preferred embodiment of the present invention. The head 100 according to this preferred embodiment is identical to that shown in FIG. 1 except for end portions 30 of the top pole 14. In this preferred embodiment the end portions 30 are shaped as wedges. Thus, GL2 ranges from about 60% of GL1 at its outer most point to GL1 at its inner most point.

Figure 3:
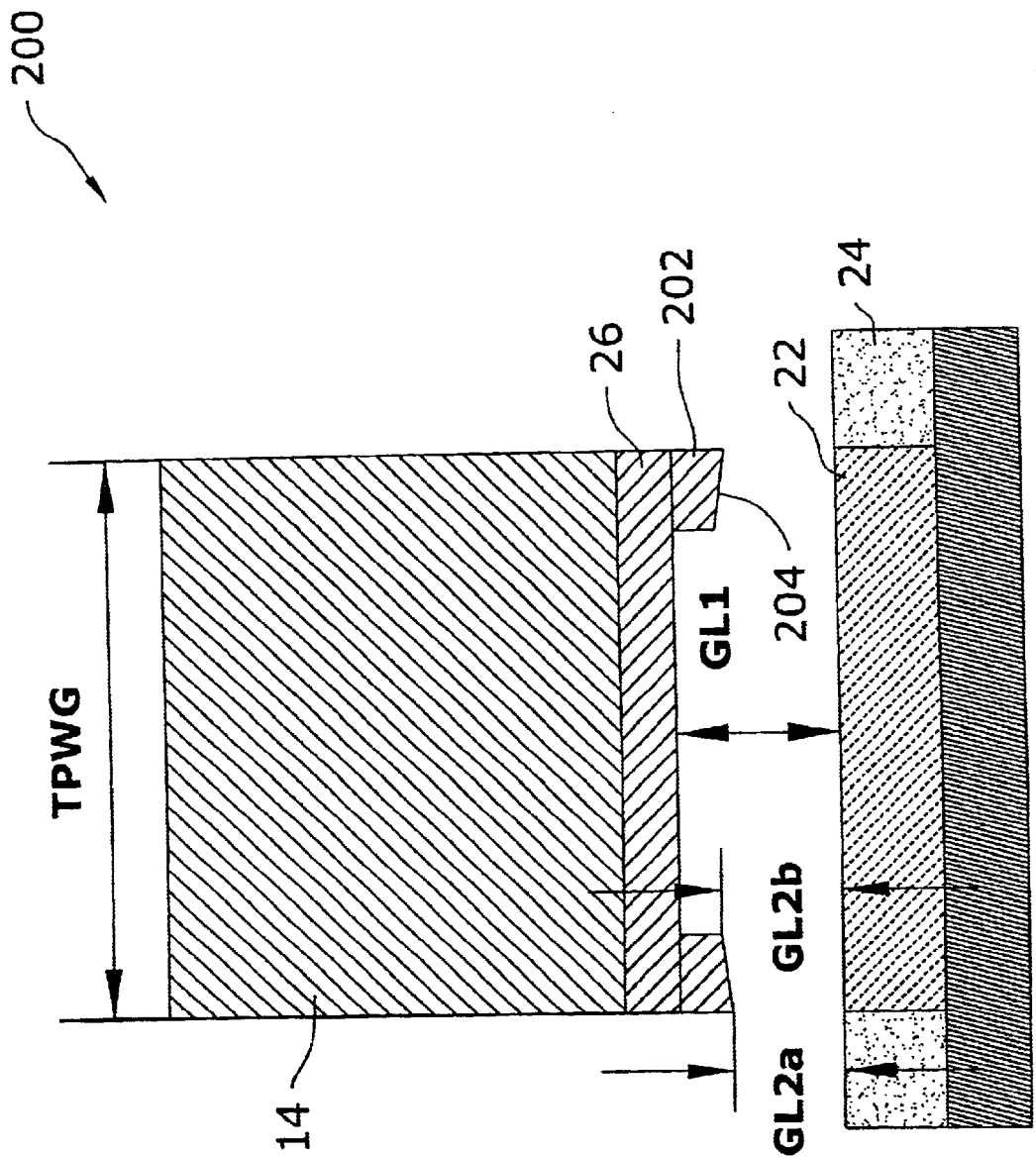
FIG. 3 shows an ABS view of a head according to a third preferred embodiment of the present invention.
Figure 4:
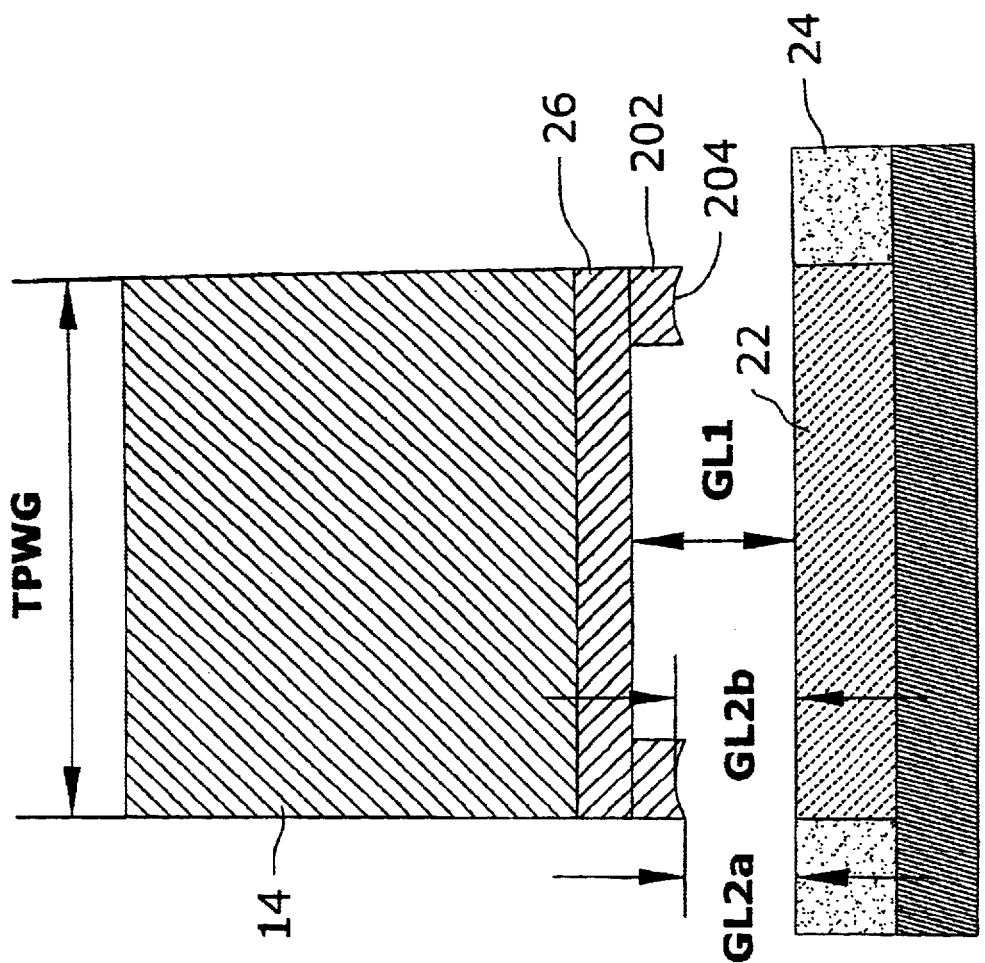
FIG. 4 shows an ABS view of a head according to a fourth preferred embodiment of the present invention.
Figure 5:
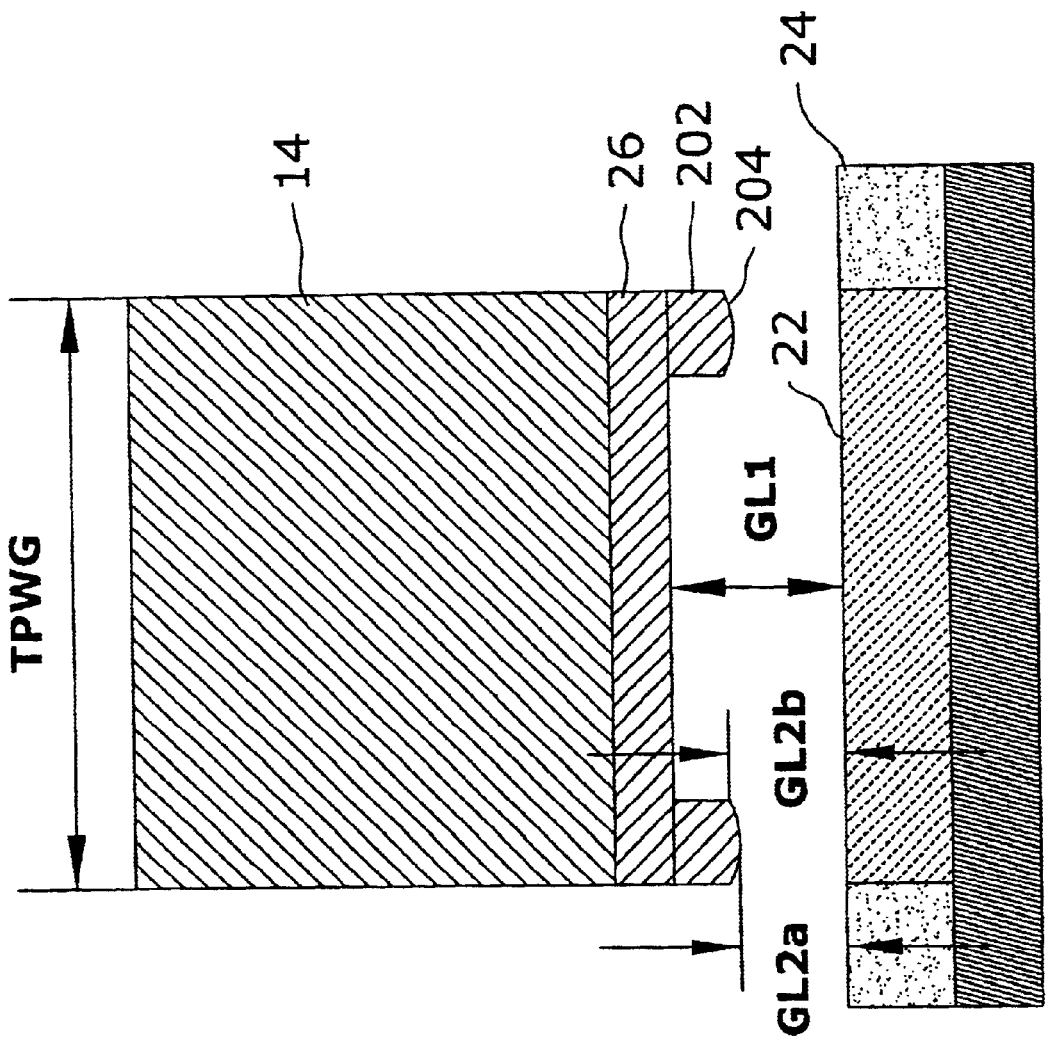
FIG. 5 shows an ABS view of a head according to a fifth preferred embodiment of the present invention.
Figure 6:
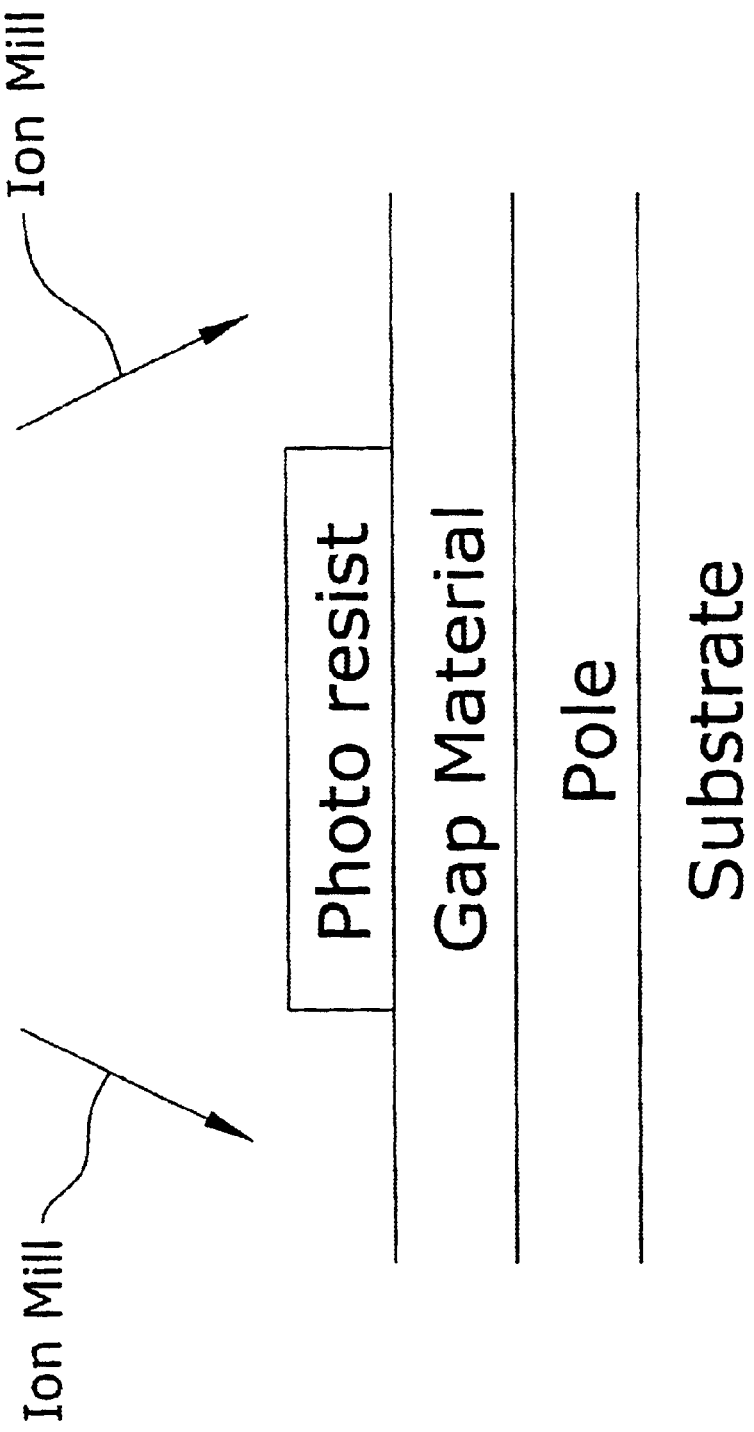
FIGS. 6–10 illustrate a method for fabricating a head according to a preferred embodiment of the present invention.
Figure 7:
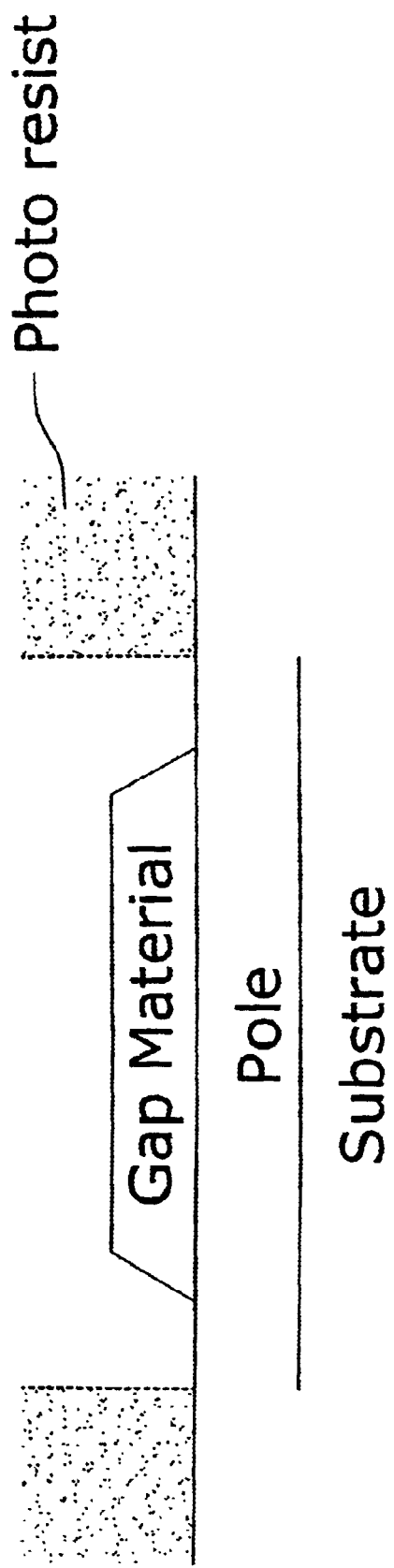
Figure 8:
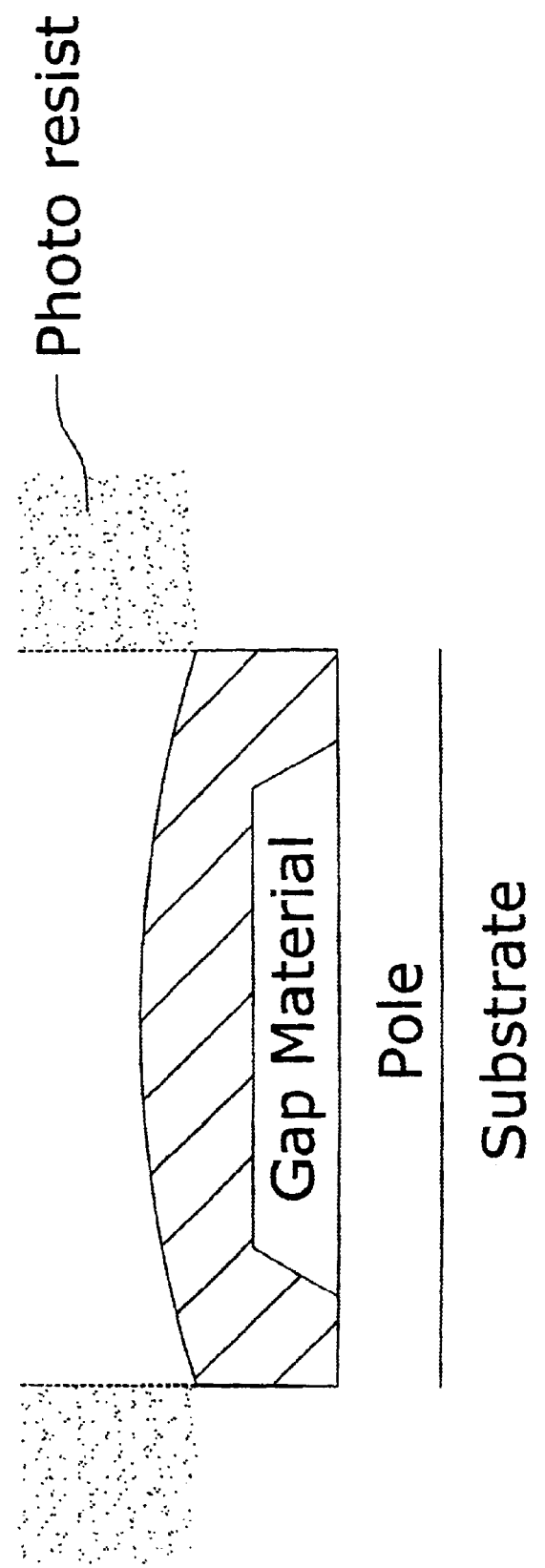
Figure 9:
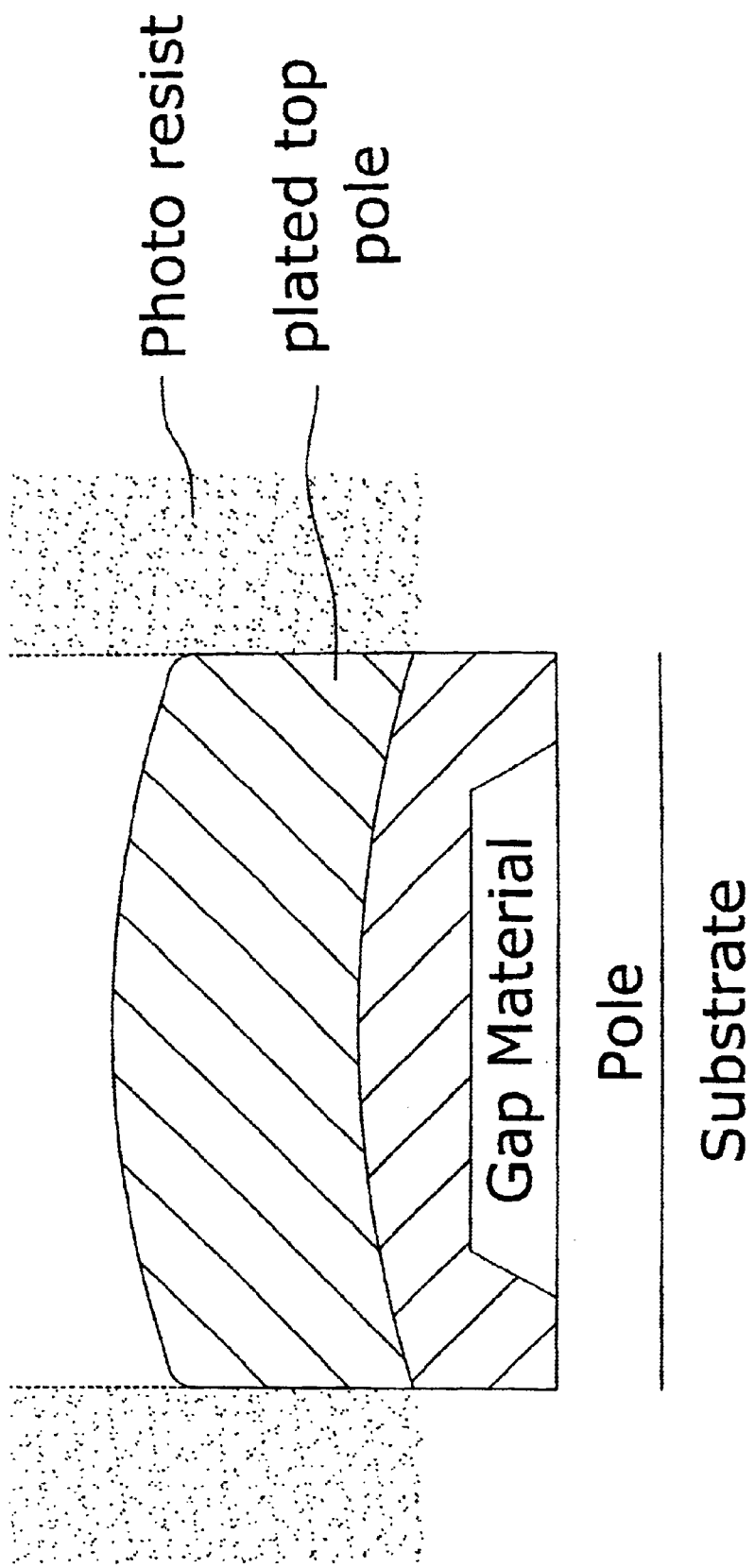

FIG. 3 shows an ABS view of a head 200 according to a third preferred embodiment of the present invention. The head 200 according to this preferred embodiment is identical to that shown in FIG. 1 except for end portions 202. In this preferred embodiment, the surface of the end portions 202 that face the bottom pole 12 are angled so that its outermost point has a gap length $GL2_a$ and at its innermost point it has a gap length $GL2^b$. In a more preferred embodiment, $GL2_a < GL2_b < GL1$. In a more preferred embodiment, $GL2_a$ is about 60% of GL1 and $GL2^b$ is about 80% of GL1. The segment 204 connected $GL2_a$ to $GL2_b$ is linear although it can also be curvilinear as shown in FIGS. 4 and 5. In FIG. 4 the segment is concave and in FIG. 5 the segment is convex. Overall what is important is that GL2 is less than GL1 and GL2 may have a range with the end portions of the top pole. In addition, the surfaces of the end portions that face the bottom pole may be parallel with the bottom pole or non-parallel with respect to the bottom pole.

The method of fabricating a head according to a preferred embodiment of this invention will now be described with reference to FIGS. 6–10. A shared pole material is first deposited on a reader gap. Deposition can be done by electroplating or any vacuum technique such as sputtering. The deposited material can be as thick as 2 um to 5 um of the gap material which can be composed of alternating layers of magnetic and non-magnetic material, is then deposited on the pole material via electroplating (i.e., NiPd) or sputtering Al2O3, SiN, SiO2. The gap material is patterned with a photoresist layer and has a width less than the design width of the top pole. An ion mill is used to remove the gap material on either side of photoresist. The variety of writer gap slope angles can be reached through a careful selection of the mill angle and mill energy. A lift off operation removes the photoresist layer used in the definition of the writer gap shape. A seed layer, 26 and 30 and top pole 14, defined in FIGS. 1 to 5, are deposited through a thick photoresist mask carefully aligned with writer gap feature (not shown in a drawing). The seed layer should have a magnetic moment Bsat higher than 1 Tesla, preferably higher than the magnetic material used in the top pole. The seed layer thickness can be from 500 Angstroms to 300 Angstroms. The seed layer defines the structure of the first top pole. In the next step, a wet etch chemical removes the thick photoresist and is followed by an ion mill process to remove the seed layer.

After that another resist (not shown) is deposited to protect all the surfaces except the pole tip area. This step is necessary to implement a second mill process which removes the bottom pole material and defines the mesa under the writer gap. In the mill process, the thickness of top pole is reduced, therefore the plating has to be thick enough to get a final top pole thickness required by design.

After the mesa is defined, a nonmagnetic material is deposited adjacent to bottom pole and the top pole 14.

Figure 10:
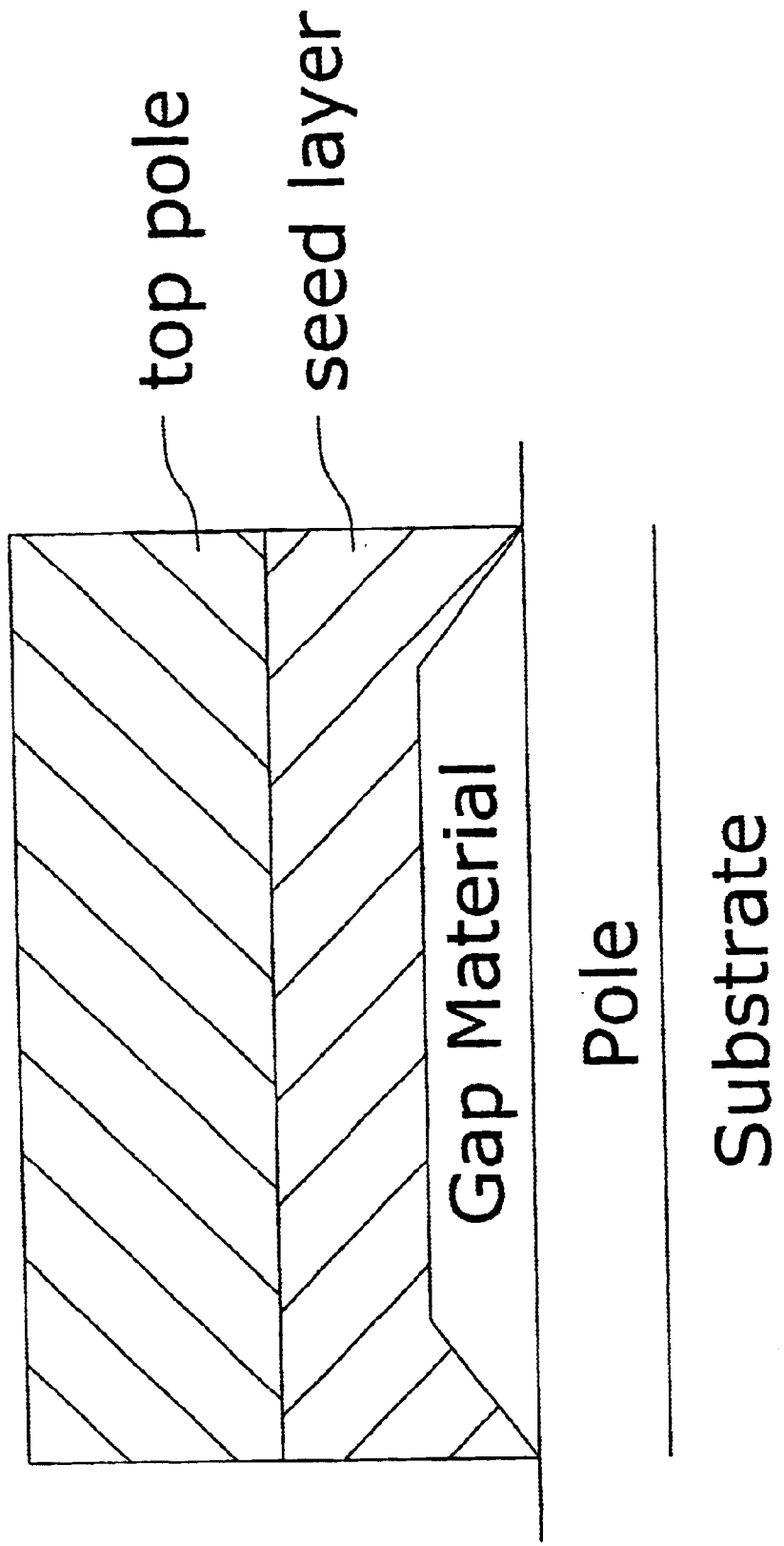

This path can be used for writers with a single top pole or writers with two piece top poles. In the last case the top pole layer is chemically mechanically polished to create a flat top surface as shown in FIG. 10.

Current writers implementing high moment materials ($B_{sat} > 1.0$ Tesla) suffer from creating transitions that are curved. The situation worsens with the smaller writer gaps, narrower TPWG and high write currents, as the curved part of transition becomes a significant part of the written track. The edge effects become dominant as the width of the top pole decreases and the curved part of the transition becomes a significant portion of the written track. The curved transition increases the transition parameter. The deterioration of the transition parameter adversely impacts the width of the pulse at half amplitude, termed also as PW50. The situation worsens even further at the higher bit per inch densities. Both transition parameter and PW50 are described on p. 213 and p. 133 in the "Theory of magnetic recording" by H. N. Bertram ed. by Cambridge University Press 1994.

Buildup of the charges at the edges of the writer's top pole causes curving of the transitions. The present invention shifts the charge build up in a controlled fashion, down from the trailing edge at the edges of the gap and effectively straightens previously curved part of the written transition. High moment seed material assures higher field gradients compared to a structure with a flat top pole. The method described above assures good control of the track curvature even for an extremely narrow writer widths, i.e., TPWG= 0.5–1.0 μm.

The best results are observed with the seed layer material exceeding the saturation moment of the top pole material. The above specification, examples and data provide a complete description of the manufacture and use of the composition of the invention. Since many embodiments of the invention can be made without departing from the spirit and scope of the invention, the invention resides in the claims hereinafter appended.

I claim:

1. A magnetic transducer writing device including a written transition having a curved portion, the device comprising:
   a bottom magnetic pole;
   a nonmagnetic gap layer deposited over said bottom magnetic pole;
   a top magnetic pole deposited over the nonmagnetic gap layer and including a high moment material having a magnetic moment saturation greater than 1 Tesla ($B_{sat}>1$ Tesla), the top magnetic pole having an upper portion and a lower portion wherein the lower portion of the top magnetic pole faces a surface of the bottom magnetic pole and wherein the lower portion has a middle section that is separated from the bottom pole by the nonmagnetic gap layer by a first distance and the lower portion has end portions located at each end of the middle portion that are separated from the bottom pole by the nonmagnetic gap layer by a second distance wherein the second distance is greater than 25% and less than 100% of the first distance, and the top magnetic pole reduces the curved portion of the written transition.

2. The device of claim 1 wherein the second distance is at least 40% of the first distance.

3. The device of claim 1 wherein the second distance is at least 50% of the first distance.

4. The device of claim 1 wherein the second distance is at least 60% of the first distance.

5. The device of claim 1 wherein the second distance ranges from about greater than 25% to about 60% of the first distance.

6. The device of claim 1 wherein the device has a width (TPWG) measured between a left and a right side of the top magnetic pole wherein the width ranges from about 0.3 microns to about 1.5 microns.

7. The device of claim 6 wherein the width ranges from about 0.3 microns to about 0.5 microns.

8. The device of claim 6 wherein the first distance is about 30% of the width of the device.

9. The device of claim 6 wherein the bottom magnetic pole comprises a shared pole, a magnetic layer deposited on the shared pole wherein the magnetic layer has a width equal to the width of the device, and a nonmagnetic region deposited on the shared pole at each end of the magnetic region.

10. The device of claim 1 wherein the first distance ranges from about 0.1 microns to about 0.3 microns.

11. The device of claim 1 wherein the first distance ranges from about 0.1 microns to about 0.15 microns.

12. The device of claim 1 wherein the end portions each have a surface that is substantially parallel with the surface of the bottom magnetic pole.

13. The device of claim 1 wherein the end portions are square in shape.

14. The device of claim 1 wherein the end portions are wedged in shape.

15. The device of claim 1 wherein the end portions have a surface that faces the surface of the bottom magnetic pole wherein the surface of the end portions are angled so that at one end of the end portion the distance between the end portion and the bottom magnetic pole is greater than at an opposite end of the end portion.

16. The device of claim 15 wherein the distance is greatest between the end portions and the bottom magnetic pole at the end portion closest to the middle portion of the top magnetic pole.

17. The device of claim 1 wherein each end portion of the top magnetic pole is defined by a segment connecting two points.

18. The device of claim 17 wherein the segment is linear.

19. The device of claim 17 wherein the segment is curvilinear.

20. The device of claim 19 wherein the segment is convex with respect to the bottom magnetic pole.

21. The device of claim 19 wherein the segment is concave with respect to the bottom magnetic pole.

* * * * *